(12) United States Patent
Eriksson et al.

(10) Patent No.: US 7,616,607 B2
(45) Date of Patent: Nov. 10, 2009

(54) DATA PRESERVATION

(75) Inventors: Ann-Christine Eriksson, Vallentuna (SE); Sandra Collins, Dublin (IE); Ingemar Backlund, Sollentuna (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 745 days.

(21) Appl. No.: 10/510,452

(22) PCT Filed: Apr. 10, 2002

(86) PCT No.: PCT/EP02/03990

§ 371 (c)(1),
(2), (4) Date: Apr. 15, 2005

(87) PCT Pub. No.: WO03/085902

PCT Pub. Date: Oct. 16, 2003

(65) Prior Publication Data

US 2006/0133315 A1    Jun. 22, 2006

(51) Int. Cl.
H04W 4/00 (2009.01)
H04J 3/24 (2006.01)
G01R 31/08 (2006.01)
H04W 72/00 (2009.01)
H04W 36/00 (2009.01)

(52) U.S. Cl. .................. 370/331; 370/349; 370/235; 455/436; 455/452.2

(58) Field of Classification Search .......... 370/331, 370/235, 230, 349, 335, 329, 328; 455/436, 455/452.2, 422.1, 437, 438, 439, 444
See application file for complete search history.

(56) References Cited

U.S. PATENT DOCUMENTS

| 6,438,370 | B1* | 8/2002 | Einola et al. ............. 455/422.1 |
| 6,714,784 | B1* | 3/2004 | Forssell et al. .............. 455/436 |
| 6,930,980 | B2* | 8/2005 | Tourunen et al. ........... 370/236 |
| 7,009,951 | B2* | 3/2006 | Kalliokulju et al. ......... 370/331 |
| 7,054,945 | B2* | 5/2006 | Hurtta et al. ................ 709/230 |
| 7,167,475 | B2* | 1/2007 | Tourunen et al. ........... 370/394 |
| 7,197,019 | B2* | 3/2007 | Menzel et al. .............. 370/331 |
| 7,319,676 | B2* | 1/2008 | Fujino ........................ 370/254 |
| 7,359,347 | B2* | 4/2008 | Ahmavaara et al. ........ 370/328 |
| 7,447,181 | B1* | 11/2008 | Forssell ...................... 370/336 |
| 2001/0017850 | A1* | 8/2001 | Kalliokulju et al. ......... 370/331 |
| 2001/0043579 | A1* | 11/2001 | Tourunen et al. ........... 370/331 |
| 2002/0107022 | A1* | 8/2002 | Muniere ..................... 455/439 |
| 2005/0007980 | A1* | 1/2005 | Landais et al. .............. 370/331 |
| 2005/0096063 | A1* | 5/2005 | Muniere ................... 455/452.2 |
| 2005/0237976 | A1* | 10/2005 | Walldeen et al. ............ 370/331 |
| 2006/0133315 | A1* | 6/2006 | Eriksson et al. ............ 370/331 |

FOREIGN PATENT DOCUMENTS

| WO | WO-98/47302 | 10/1998 |
| WO | WO-99/34635 | 7/1999 |
| WO | WO-01/74095 | 10/2001 |

* cited by examiner

*Primary Examiner*—Hanh Nguyen
(74) *Attorney, Agent, or Firm*—Michael Cameron

(57) ABSTRACT

A method ensures that data is not lost during an inter-Routing Area or inter-Network Service Entity cell change in a GPRS network. When a mobile station passes from one cell into another, a command is sent from the SGSN to the BSS serving the first cell, causing that BSS to discard any data awaiting transmission to the mobile station. A reply is sent from the BSS to the SGSN, and, in response thereto, the SGSN transmits data to the BSS serving the new cell, in order to ensure that all of the data intended for the mobile station is transmitted thereto.

27 Claims, 3 Drawing Sheets

DATA PRESERVATION

TECHNICAL FIELD OF THE INVENTION

The invention relates to a mobile communications network, and in particular to a method for ensuring that data is not lost when a mobile device moves between different cells in a cellular system.

BACKGROUND OF THE INVENTION

In a known General Packet Radio Service (GPRS) mobile communications network, a Gateway GPRS Support Node (GGSN) acts as a gateway to and from an Internet Service Provider (ISP), and has a connection to a general data communications network. Connected to the GGSN is a Serving GPRS Support Node (SGSN), which is further connected to multiple Base Station Systems (BSS).

A mobile station (MS), which is active within the network, has a connection to one BSS, and the SGSN handles the routing of data from the GGSN to the BSS.

Each BSS has at least one Packet Control Unit (PCU), which handles the different GPRS users, and schedules data on the radio resources which are available for GPRS users in the cell.

When downlink data is transmitted to an MS in a GPRS network, the data is buffered, in the form of Logical Link Control (LLC) Packet Data Units (PDU) both in the SGSN and in the BSS. The LLC is the protocol which provides a logical link between the MS and the SGSN.

There are two modes of LLC operation, as defined in the 3rd Generation Partnership Project Technical Specification 3GPP TS 44.064 V5.0.0 Sections 4.3 and 4.4, namely unacknowledged operation and acknowledged operation.

In acknowledged operation, PDUs are transmitted in numbered Information (I) frames. The SGSN retains a copy of each transmitted LLC-PDU, until this is acknowledged by the MS.

In unacknowledged operation, LLC-PDUs are transmitted in numbered Unconfirmed Information (UI) frames. These UI frames are not acknowledged at the LLC layer, and the SGSN does not need to save LLC-PDUs that are transmitted to the MS.

As further defined in the 3rd Generation Partnership Project Technical Specification 3GPP TS 08.18 V8.9.0, section 8.1, when an SGSN detects a cell change of an MS, the SGSN sends a FLUSH-LL PDU to the BSS controlling the old cell. At that time, the BSS may contain stored PDUs, which are awaiting transmission to the MS. In some cases, for example if the new cell is associated with the same BSS, and if the new cell is in the same routing area as the old cell, it will be possible for those PDUs to be transferred to a queue in the BSS associated with the new cell.

However, if that is not possible, the PDUs are deleted. In that case, this data cannot be transmitted to the mobile station using the LLC protocol. Instead, it must be retransmitted using a higher layer protocol, which can lead to a substantial reduction in the rate at which data can be transmitted to the mobile station.

SUMMARY OF THE INVENTION

According to a first aspect of the present invention, there is provided a method which ensures that data is not lost during a cell change. As applied to a GPRS network, the invention ensures that data is not lost during an inter-Routing Area or inter-Network Service Entity cell change, or during another cell change in which data are deleted at a radio access node.

More specifically, when a mobile station passes from one cell into another, a command is sent from a core network node to the radio access node serving the first cell. A reply is sent from the radio access node to the core network node, and, in response thereto, the core network node transmits data to the radio access node serving the new cell, in order to ensure that all of the data intended for the mobile station is transmitted thereto.

In particular, the command which is sent from the core network node to the radio access node serving the first cell causes that radio access node to discard any data awaiting transmission to the first cell, and the core network node then transmits the discarded data to the radio access node serving the new cell.

In preferred embodiments of the invention, the network is a GPRS network, the radio access node is a Base Station System (BSS), typically including multiple Radio Base Stations (RBSs), and the core network node is a SGSN. Further, in that case, the command sent from the SGSN to the BSS is a FLUSH command.

In the case of a GPRS network, cell changes in which data are deleted at a radio access node are usually inter-Routing Area or inter-Network Service Entity cell changes. A Routing Area may be defined to be equivalent to a Base Station System (BSS) or a Radio Access Network (RAN), and a Network Service Entity may be defined to be equivalent to a BSS, but this is not required.

Thus, the cell change may be from a first cell to a second cell, where the first and second cells are, for example (a) served by different Radio Base Stations in different Network Service Entities and in different Base Station Systems, (b) served by different Radio Base Stations in different Network Service Entities within the same Base Station System, (c) served by different Radio Base Stations in the same Network Service Entity within the same Base Station System.

In a preferred embodiment, all data transmitted from the core network node to a radio access node is stored in the core network node for a predetermined time. In response to the command from the core network node, the radio access node serving the first cell sends a reply which identifies the discarded data, and the core network node sends copies of the discarded data to the new radio access node serving the new cell.

In an alternative preferred embodiment of the invention, the radio access node receives the command causing it to discard the untransmitted data and, in response thereto, it sends the untransmitted data to the core network node, for forwarding to the radio access node serving the new cell.

The network preferably has two modes of operation in which data can be sent from the core network node to the radio access node, namely an acknowledged mode in which data are stored in the core network node until acknowledged by the mobile station, and an unacknowledged mode in which data are not acknowledged by the mobile station. In that case, the methods according to the invention are particularly applicable to data sent in unacknowledged mode.

In the case of a GPRS network, the acknowledged mode and the unacknowledged mode are LLC-acknowledged mode and LLC-unacknowledged mode.

DETAILED DESCRIPTION OF PREFERRED EMBODIMENTS

Figure 1:
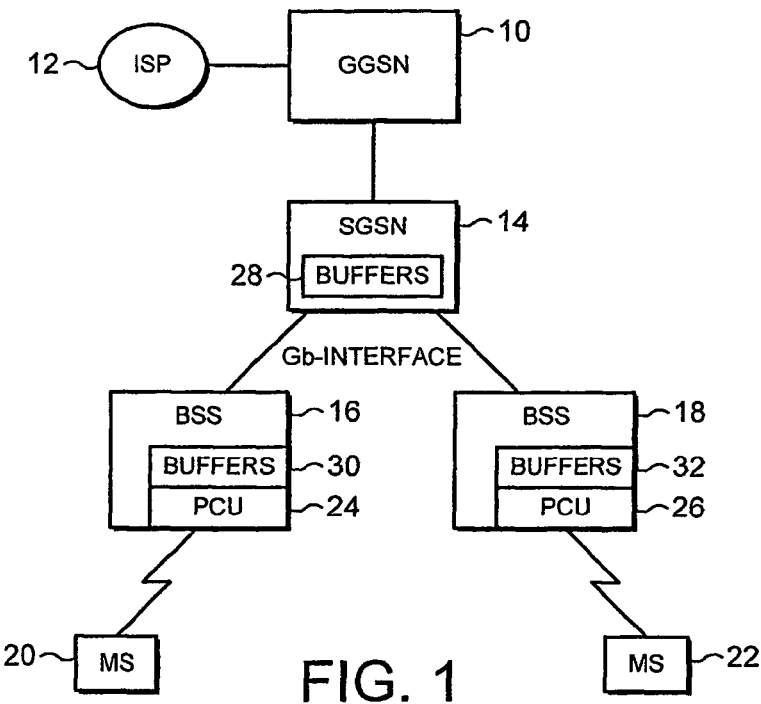
FIG. 1 is a schematic representation of a mobile communications network in accordance with the present invention.

FIG. 1 is a schematic representation of a part of a General Packet Radio Service (GPRS) mobile communications network, for example operating in accordance with the standards set by the 3rd Generation Partnership Project.

The network includes at least one Gateway GPRS Support Node (GGSN) 10, which is the gateway to a general data communications network (not shown), for example through an Internet Service Provider (ISP) 12. Each GGSN 10 is connected to one or more Serving GPRS Support Nodes (SGSN) 14, of which only one is shown in FIG. 1.

Each SGSN is connected to a plurality of Base Station Systems (BSSs) 16, 18. It will be apparent to the person skilled in the art that a real network will include more SGSNs and BSSs than the small number illustrated in FIG. 1. However, description of those additional nodes is not required for an understanding of the present invention.

As is known, each BSS 16, 18 is in radio communication with any Mobile Stations (MS) which are active within their respective cells. For example, FIG. 1 shows a first MS 20, having a connection over the air interface to the BSS 16, and also shows a second MS 22, having a connection over the air interface to the BSS 18. Again, it will be apparent that the network can provide service to many more such Mobile Stations.

Each BSS 16, 18 includes a respective Packet Control Unit (PCU) 24, 26 which handles the GPRS users and schedules data on the radio resources available for a GPRS user in a cell.

When transmitting data to an MS 20, 22 in a GPRS network, the data is buffered in a buffer 28 in the SGSN, and in a buffer 30, 32 in the respective BSS.

A Routing Area (RA) is a collection of cells, which may be equivalent to the cells served by one Base Station System, or may be a subset of the cells served by a Base Station System, or may be a collection of cells served by more than one Base Station System. A Network Service Entity (NSE) is a logical entity located in the Base Station System or in the SGSN. One Network Service Entity in the Base Station System communicates with one Network Service Entity in the SGSN (in a one-to-one relationship). One or more Network Service Entities may be defined per Base Station System. Similarily one or more Network Service Entities may be defined per SGSN. A Network Service Entity cannot comprise more than one Base Station System, or more than one SGSN.

In the embodiment described with reference to FIG. 1, it is assumed that one Base Station System (BSS) is equivalent to one routing area and also to one Network Service Entity (NSE), and that one BSS also contains one PCU. It is of course possible to have multiple PCUs, NSEs and routing areas in any BSS.

Figure 2:
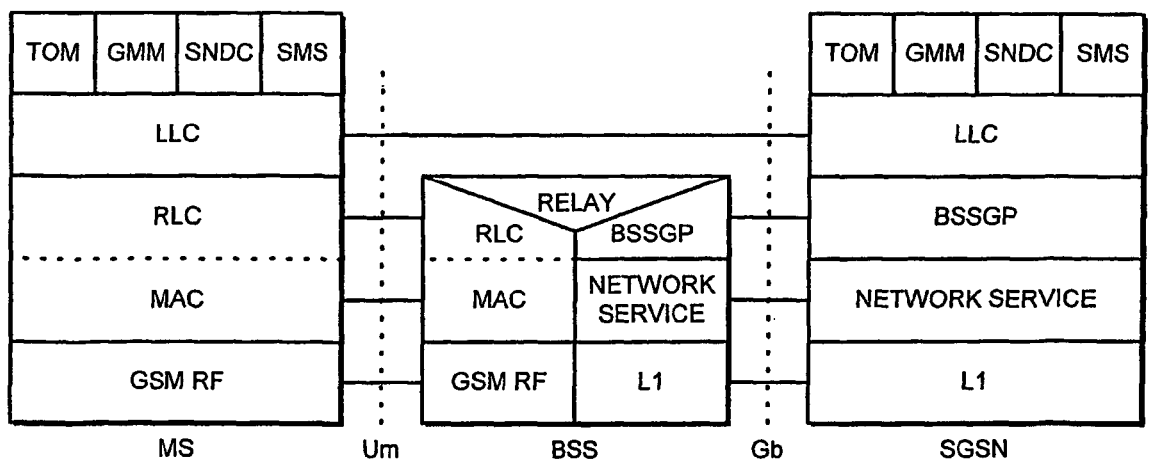
FIG. 2 illustrates the data transmission protocols in use in a part of the network shown in FIG. 1.

FIG. 2 illustrates the protocol stacks which are in use between the Mobile Station MS and Base Station System BSS on the air interface (or Um interface), and between the BSS and the SGSN on the Gb interface. The protocol stack on the air interface is conventional, and is for example illustrated and described in 3GPP TS 44.064 V5.0.0 section 4.1. It will therefore not be described further herein, but is provided only to illustrate the protocols used in the present invention, in particular the Logical Link Control (LLC), which provides a logical link between the MS and SGSN, and the BSS GPRS Protocol (BSSGP), which is used between the BSS and SGSN.

The type of data that is buffered in the SGSN and in the BSS is in the form of Logical Link Control (LLC) Packet Data Units (PDUs).

There are two LLC modes, namely acknowledged and unacknowledged mode. In unacknowledged LLC mode, PDUs are transmitted in numbered Unconfirmed Information (UI) frames, and the SGSN will not save LLC-PDUs that are transmitted to the MS. In acknowledged LLC mode, LLC-PDUs are transmitted in numbered Information (I) frames, and the SGSN retains a copy of the transmitted LLC-PDU until positively acknowledged by the MS.

The LLC-PDUs that are sent from the SGSN to the BSS are associated with a BSSGP Virtual Connection Identity (BVCI) and identified by a Temporary Logical Link Identity (TLLI). They may also be associated with a Packet Flow Identity (PFI) if the Packet Flow Management (PFM) procedure is in use between the SGSN and the BSS.

When the PFM procedure between the SGSN and the BSS is used there may be several packet data flows to the BSS for a Mobile Station, each of a certain Quality of Service. The PFM procedure is used to differentiate between LLC-PDU data flows having different Quality of Service requirements. A Packet Flow Context (PFC) and its Packet Flow Identity (PFI) identify each packet data flow. A BVCI, TLLI, PFI and a LLC-PDU are included in the BSSGP PDUs sent from the SGSN to the BSS when the PFM procedure is used.

The time LLC-PDUs should be stored in the BSS is specified by the PDU Lifetime. If the BSS cannot transmit the LLC-PDU to the MS before the PDU Lifetime expires, then the LLC-PDU is discarded in the BSS. The BSS then informs the SGSN about the amount of discarded data.

The data flow between the SGSN and the BSS is regulated by a flow control mechanism on the Gb-interface. The data flow may be controlled per BVC (BSSGP Virtual Connection, i.e. per cell) and/or per mobile station. The BSS informs the SGSN about the bucket size per BVC and/or per MS in the BSS, and the allowed bit rate on the Gb-interface per BVC and/or per MS to the BSS. In case a bucket in the BSS is overflowed the BSS may discard new LLC-PDUs from the SGSN. The BSS informs the SGSN about the amount of discarded data. Overflow of buckets in the BSS may happen at for example sudden changes of radio conditions for an MS or at cell change.

Figure 3:
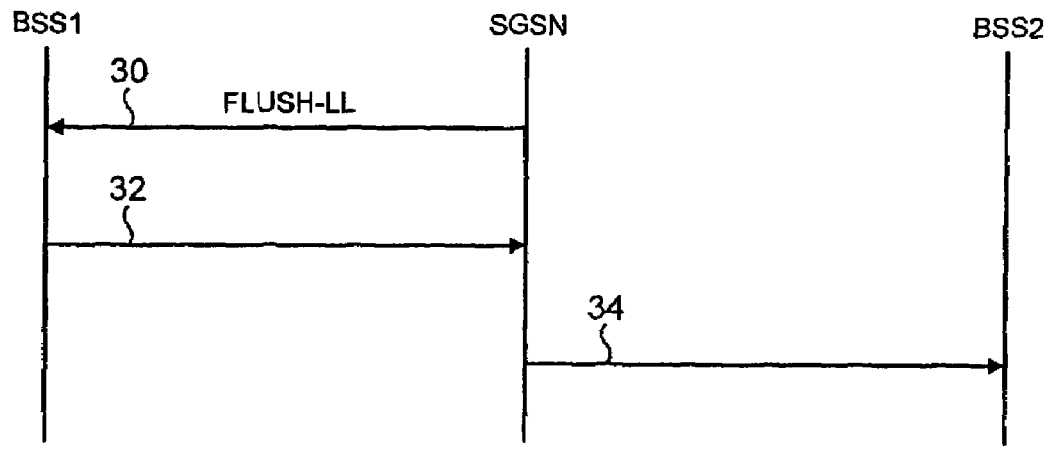
FIG. 3 illustrates a first method in accordance with the present invention.

FIG. 3 illustrates the sequence of messages sent in a method according to the present invention.

When an SGSN detects a cell change of an MS, the SGSN sends a FLUSH-LL PDU, message 30, to the current BSS (BSS1 in FIG. 3). This message corresponds to the message described in 3GPP TS 08.18 V8.9.0 section 8.1.

This invention is primarily concerned with the situation in which there are one or more LLC-PDUs stored in the BVCI related to a specific cell of BSS1, awaiting transmission to the mobile station, which would otherwise have to be deleted because they cannot be transferred to a "new" BVCI corresponding to the new cell. Moreover, the invention is primarily concerned with the situation where these LLC-PDUs, which are to be deleted, have been transmitted in LLC-unacknowledged mode. It will be appreciated that, if there are any such LLC-PDUs which have been transmitted in acknowledged mode, they will be stored within the SGSN, until there is an acknowledgement that they have been successfully transmitted to the mobile station.

In the event that there are unacknowledged mode LLC-PDUs, which are to be deleted from the BVCI related to a specific cell in BSS1, BSS1 sends a return message to the SGSN, message 32 in FIG. 3, and this message includes a tag to identify that it is a response to the received FLUSH message 30. Further, this return message 32 also contains copies of any LLC-PDUs (UI frames), which are to be deleted from the BVCI related to a specific cell in BSS1.

In response to this message from BSS1, the SGSN sends a new message, message 34 in FIG. 3, to the new Base Station System BSS2 controlling the new cell. This new message can contain the copies of the LLC-PDUs which were contained in message 32 from the old Base Station System BSS1, or the SGSN can simply retransmit the relevant LLC-PDUs directly to the new Base Station System.

The transmission of data over the air interface from the new Base Station System BSS 2 to the mobile station can then begin immediately.

This therefore ensures that, when a mobile station changes cell from one cell to another, there is no loss of data in the LLC layer, which would otherwise require re-transmission at a higher layer protocol.

Figure 4:
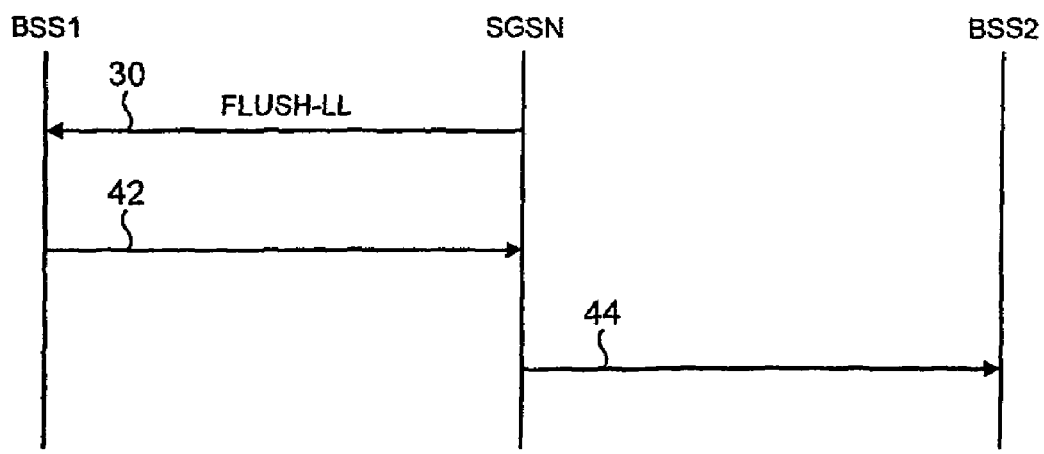
FIG. 4 illustrates a second method in accordance with the invention.

FIG. 4 shows an alternative procedure in accordance with another embodiment of the present invention.

Again, the illustrated procedure begins with the SGSN sending a FLUSH-LL PDU, message 30, to the old Base Station System BSS1, when it is determined that a cell change has occurred.

However, a difference between this process, and the process illustrated in FIG. 3, is that, in this case, all LLC-PDUs that are transmitted from the SGSN to the PCU in the BSS are kept in the SGSN, even in unacknowledged mode, until it can be assumed that they have been transmitted to the mobile station, or need to be deleted for some other reason. For example, the SGSN can retain a copy of all LLC-PDUs for a finite period of time, such as the Packet Data Unit Lifetime (PDU Lifetime). Thus, even LLC-PDUs which are sent in unacknowledged mode are retained in the SGSN although, in the normal course of events, these stored PDUs are deleted after the preset time has expired.

However, if the MS changes cells, it is these retained PDUs which are used.

Thus, in response to the FLUSH-LL message 30, the old Base Station System BSS1 sends a reply message 42 which identifies the LLC-PDUs which have been deleted. More specifically, the message 42 includes a tag which identifies that it is a response to a received FLUSH message, and further indicates the mobile station to which the FLUSH message related, as well as the number of LLC-PDUs (UI frames) which have been deleted.

For example, if the Packet Flow Management (PFM) procedure is in use between the SGSN and the Base Station System BSS 1, the message 42 includes the Packet Flow Indicator (PFI) and the number of discarded LLC-PDUs for that PFI, in addition to the BVCI and the TLLI. The SGSN may then determine which LLC-PDUs have been discarded in the BSS by counting backwards from the most recently sent LLC-PDU, until the number of discarded PDUs has been reached. This is done per PFI, TLLI and BVCI.

Alternatively, if the PFM procedure is not in use, the message 42 simply indicates the number of discarded LLC-PDUs per BVCI and TLLI. In that case, the SGSN can determine which PDUs were discarded in the BSS by counting backwards from the most recently sent LLC-PDU per TLLI and BVCI.

As an alternative, the message 42 can contain an indication of the indices of the LLC-PDUs that have been deleted in the Packet Control Unit of BSS1.

On receipt of the message 42 from BSS1, the SGSN sends a message 44 to the new Base Station System BSS2, containing the PDUs which had been discarded in BSS1, or the SGSN can simply retransmit the relevant LLC-PDUs directly to the new Base Station System.

The PCU in BSS 2 can then immediately begin downlink transfer of data to the mobile station, again without requiring retransmission of the data on a higher layer protocol.

The invention is described above with reference to a network architecture in which each BSS corresponds to one Routing Area (RA) and one Network Service Entity (NSE). Thus, when there is a cell change between Routing Areas or between Network Service Entities, the new cell is served by a different BSS from the first.

Figure 5:
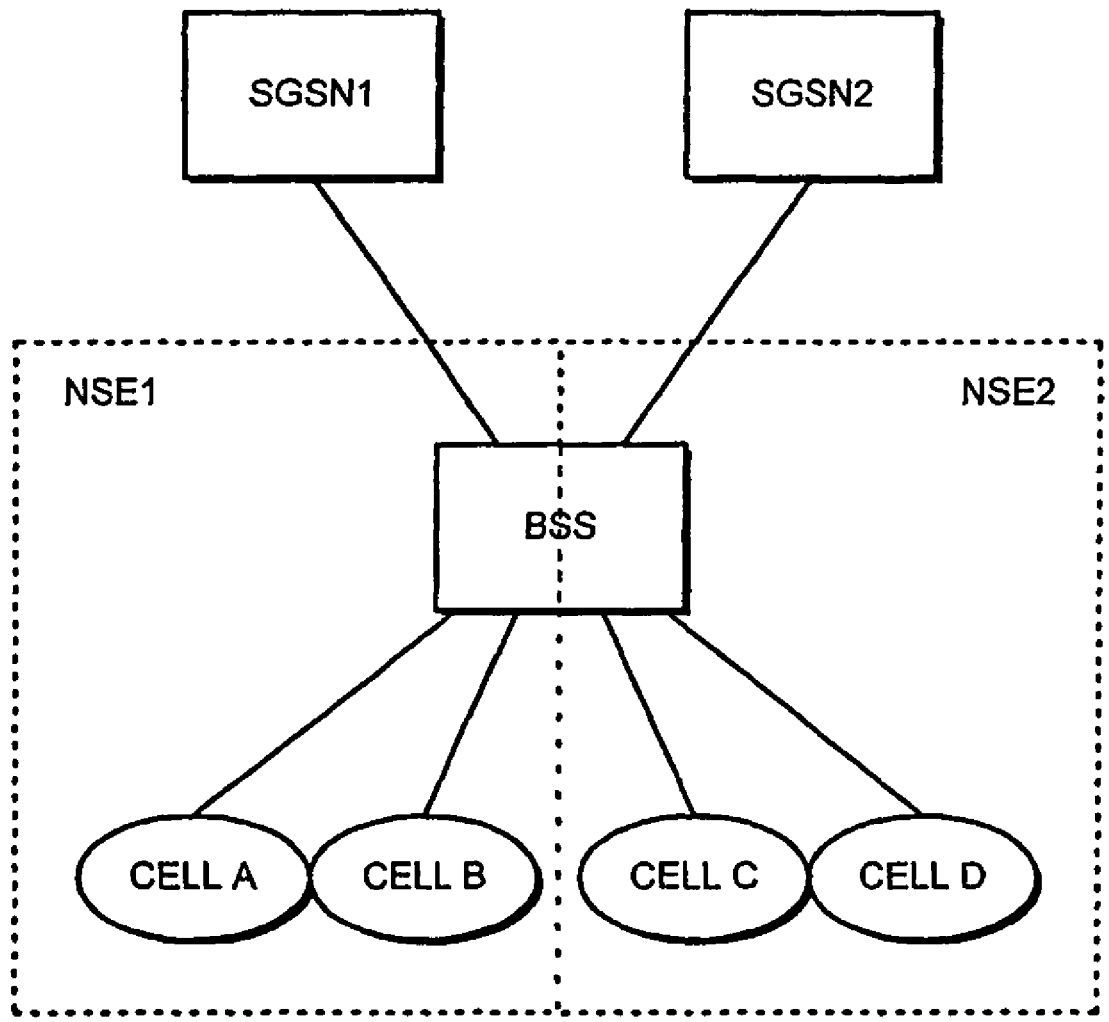
FIG. 5 shows a part of a second mobile communications network in accordance with the present invention.

In the architecture shown in FIG. 5, the BSS contains two NSEs, NSE1 and NSE2, which are connected to respective SGSNs, SGSN1 and SGSN2.

In use, the SGSN sends data to the BSS and the NSE is used to route it to the correct cell.

In this case, the MS may change cell to a cell served by a different NSE within the same BSS. If the cell change is from a first cell to a second cell, and the first cell is in a first NSE (NSE1) served by a first SGSN (SGSN1), the second cell may be in a second NSE (NSE2) served by a second SGSN (SGSN2). As described in 3GPP TS 08.18 V8.9.0 section 8.1, the data buffered in the first NSE (NSE1) cannot be transferred to the second NSE (NSE2).

Therefore, when the FLUSH message is received in the BSS, the stored data is deleted. In accordance with the invention, the BSS sends a notification to the first SGSN (SGSN1) that it has been deleted. As discussed above with reference to FIGS. 3 and 4, this notification may allow the deleted data to be identified, or may contain copies of the deleted data. The first SGSN (SGSN1) then sends the deleted data to the second SGSN (SGSN2), which sends the data back to the second NSE (NSE2) in the same BSS serving the new cell.

The standard, at 3GPP TS 08.18 V8.9.0 section 8.1, also mentions the possibility that LLC-PDU(s) for a given MS stored at the old cell may be deleted, even in the event of a cell change within one Network Service Entity and within one routing area. Again, in accordance with the invention, the BSS can delete the stored data and notify the SGSN that it has been deleted. The SGSN can then send the deleted data to the new cell.

There are therefore disclosed methods which allow any data, which have been discarded in an old radio access node, to be transmitted from the SGSN to a new radio access node, when a mobile station changes cells.

The invention claimed is:

1. A method of controlling a cell change in a mobile communications network, in which data is transmitted from a serving GPRS support node (SGSN) to a mobile station in packets, and in which data packets are stored in a respective radio access node before transmission to the mobile station, the method comprising:

detecting a cell change of a mobile station, from a first cell served by a first cell radio access node to a second cell served by a second cell radio access node;

sending a first message from the SGSN to the first cell radio access node in response to detecting a cell change of the mobile station, sending a reply message from the first cell radio access node to the SGSN, wherein the reply message comprises at least a copy of one of the data packets awaiting transmission to the mobile station and unable to be transferred to the second cell radio access node;

discarding the at least one of the data packets in the first cell radio access node; and in response to said reply message, transmitting said copy of at least one of the data packets from the SGSN to the second cell radio access node.

2. A method as claimed in claim 1, wherein the reply message includes a tag identifying a response to the first message.

3. A method as claimed in claim 2, wherein the first message is a FLUSH-LL command.

4. A method as claimed in claim 2, wherein the data packets comprise data packets transmitted in LLC unacknowledged mode.

5. A method as claimed in claim 2, wherein the second cell is in a different Routing Area or different Network Service Entity from the first cell.

6. A method as claimed in claim 1, wherein data is transmitted from the SGSN to a radio access node in acknowledged mode or in unacknowledged mode, wherein data transmitted in unacknowledged mode are retained in the SGSN for a predetermined time period, and wherein said reply message allows the data packets discarded in the first cell radio access node to be identified in the SGSN.

7. A method as claimed in claim 6, wherein said reply message indicates the number of data packets discarded in the first cell radio access node.

8. A method as claimed in claim 6, wherein said reply message specifically identifies the data packets discarded in the first cell radio access node.

9. A method as claimed in claim 6, wherein the reply message indicates indices of the data packets discarded in the first cell radio access node.

10. A method as claimed in claim 9, wherein the first message is a FLUSH-LL command.

11. A method as claimed in claim 6, wherein the network is a GPRS network, and the acknowledged mode and unacknowledged mode are LLC-acknowledged mode and LLC-unacknowledged mode respectively.

12. A method as claimed in claim 1, wherein said reply message includes copies of the data packets discarded in the first cell radio access node.

13. A method as claimed in claim 1, wherein the network is a GPRS network, the first cell radio access node is a first BSS, and the second cell radio access node is a second BSS.

14. A method as claimed in claim 1, wherein the network is a GPRS network, the first cell radio access node is a first BSS, and the second cell radio access node is the first BSS.

15. A method as claimed an claim 1, wherein: the network is a GPRS network, the SGSN comprises a first SGSNi the first cell is in a first NSE served by the first SGSNi and the second cell is in a second NSE served by a second SGSNi and wherein the step of transmitting said data packets from the SGSN to the second cell radio access node comprises transmitting said data packets from the first SGSN to the second SGSN and then to the second cell radio access node.

16. A radio access node, for use in a mobile communications network, the radio access node comprising means for storing data packets before transmission to a mobile station, the radio access node further comprising:

means for acting on a first message received from a serving GPRS support node (SGSN) indicating a cell change from a first cell served by the radio access node to a second cell served by a second cell radio access node of a mobile station, by:

sending a reply message in response to the first message to the SGSN having at least a copy of one of the data packets awaiting transmission to the mobile station and unable to be transferred to the second cell radio access node; and discarding the data packets in the radio access node.

17. A radio access node as claimed in claim 16, wherein said reply message indicates the number of data packets discarded in said radio access node.

18. A radio access node as claimed in claim 16, wherein said reply message specifically identifies the data packets discarded in said radio access node.

19. A radio access node as claimed in claim 16, wherein said reply message includes copies of the data packets discarded in the radio access node.

20. A radio access node as claimed in claim 16, wherein the network is a GPRS network, and the radio access node comprises a BSS.

21. A radio access node as claimed in claim 16, wherein the reply message indicates indices of the data packets discarded in the radio access node.

22. A radio access node as claimed in claim 21, wherein the first message is a FLUSH-LL command.

23. A serving GPRS support node (SGSN) for use in a mobile communications network, in which data is transmitted from the SGSN to a mobile station in packets, and in which data packets are stored in a respective radio access node before transmission to the mobile station, the SGSN comprising:

means for detecting a cell change of a mobile station, from a first cell served by a first cell radio access node to a second cell served by a second cell radio access node;

means for sending a first message from the SGSN to the first cell radio access node in response to a cell change detection, said first message causing the first cell radio access node to send a copy of data packets awaiting transmission to the mobile station and unable to be transferred to the second cell radio access node and deleting the data packets awaiting transmission to the mobile station;

means for receiving a reply to said first message, wherein the reply comprises a copy of the data packets and, in response to said reply, transmitting said copy of data packets from the SGSN to the second cell radio access node.

24. The SGSN as claimed in claim 23, wherein the reply includes copies of the data packets to be deleted.

25. The SGSN as claimed in claim 24, wherein, when the second cell is served by a second different SGSN, said node is adapted to transmit said discarded data packets to the second cell radio access node through the second SGSN.

26. The SGSN as claimed in claim 23, wherein data is transmitted from the SGSN to a radio access node in acknowledged mode or in unacknowledged mode, wherein data transmitted in unacknowledged mode are retained in the SGSN for a predetermined time period, and wherein said reply message allows the data packets discarded in the first cell radio access node to be identified in the SGSN.

27. The SGSN as claimed in claim 26, wherein the network is a GPRS network, and the acknowledged mode and unacknowledged mode are LLC acknowledged mode and LLC un-acknowledged mode respectively.

* * * * *